Nov. 9, 1948.                J. F. DONAT                2,453,206
                              AIR FILTER
                          Filed May 1, 1946

INVENTOR.
John F. Donat
BY
Morton S. Brockman

Patented Nov. 9, 1948

2,453,206

UNITED STATES PATENT OFFICE 2,453,206

AIR FILTER

John F. Donat, Euclid, Ohio

Application May 1, 1946, Serial No. 666,345

3 Claims. (Cl. 183—50)

This invention relates to air filters and particularly to devices which may be interposed in an air conduit connected to hot air furnaces and which prevent fine dust suspended in the air column in the conduit from passing into a room.

Conducive to a clearer understanding and appreciation of this invention it should be pointed out that heretofore many efforts have been made to prevent basement or combustion dust from entering the living room of a home by way of the hot air conduits and wall registers. Filtering the air passing through the conduits is the most popular method, the most economical and the most practical.

Of the many prior art inventions intended to solve this annoying problem, the most common has been the one employing replaceable filters that are made of loosely woven or matted fibers or strands. These filters are relatively expensive to replace and their effectiveness or usefulness is limited. The fibers of such filters are generally coated with a tacky substance which retains the dust particles and prevents them from passing into the room. However, the effective tackiness of the substance is soon lost. The heated air soon dries the material and because of the layers of dust collected thereon the matted material ceases to thoroughly filter the air in a relatively short time. Such filters cannot be easily cleaned. It is generally more economical and practical to replace them entirely.

Another disadvantage of said matted filters is that they dissipate much of the heat before it enters the room, and such devices are inefficient when used with gravity type furnaces or where no forced draft is employed.

Some other types of filters employ a cloth mounted behind the register grill in the room. These have been found to be unsanitary and are difficult to replace or clean.

It is, therefore, the primary object of this invention to provide a filter unit which may be interposed in any air conduit of a conventional hot air furnace.

Another object is to provide an article of this type which may be easily removed from the conduit so that it may be quickly and easily cleaned and replaced, and which removal does not necessitate cooling or stopping the operation of the furnace.

A further object is to construct an air filter with a coarsely woven metal screen to stop the passage of coarse particles of dust, and with a finely woven wire mesh spaced from the screen to stop the passage of fine particles of dust; and which screen and mesh do not materially hinder the flow of air, or materially reduce the temperature of the air thus flowing through.

Still another object of the invention is to make such device economically and out of simple standard parts so that it may be easily installed in old furnaces as well as new furnaces without the requirement of special tools or equipment and without the necessity of using highly skilled labor therefor.

These and other objects of the invention will become apparent from the reading of the following specification and claims together with the accompanying drawing wherein like parts are referred to and indicated by like reference characters and wherein:

Figure 1:
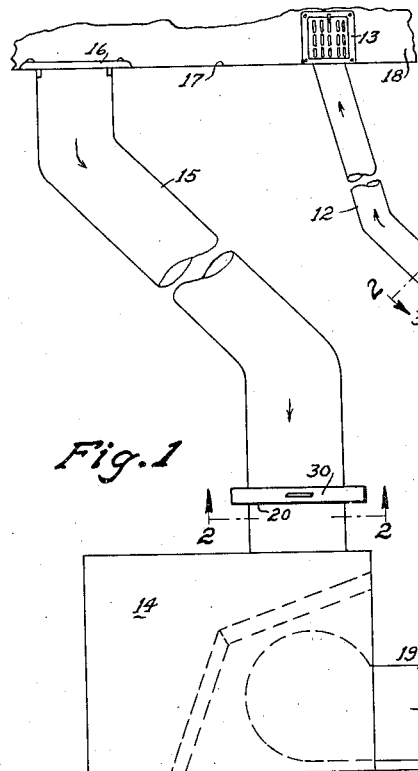
Figure 1 is a comprehensive view of a heating system embodying air filters made in accordance with the instant invention.
Figure 4:
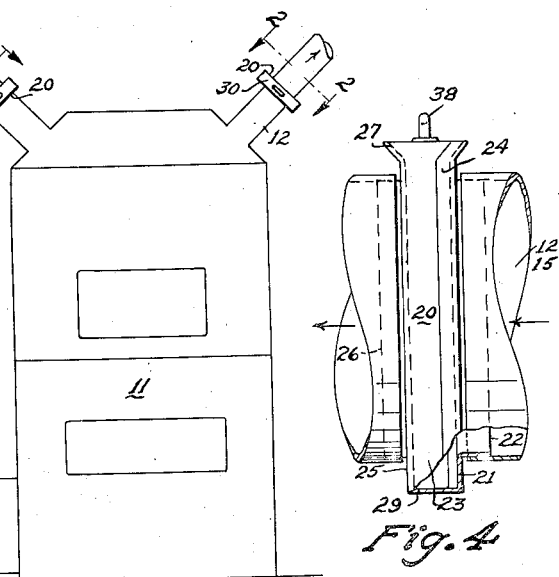
Figure 4 is a side view of the same portion and filter member taken along the line and in the direction of the arrows 4—4 of the Figure 2.
Figure 2:
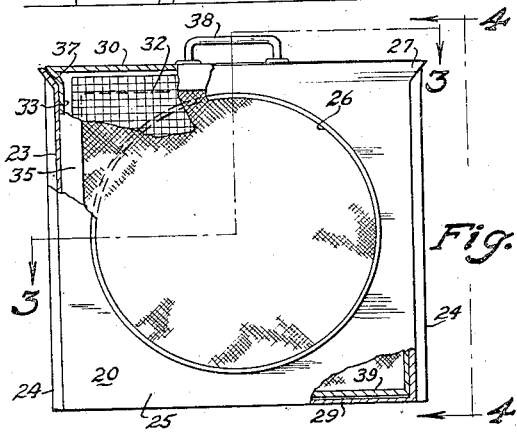
Figure 2 is a view of a portion of the heating system taken substantially along any of the lines 2—2 of the Figure 1, with parts thereof broken away to show construction.
Figure 5:
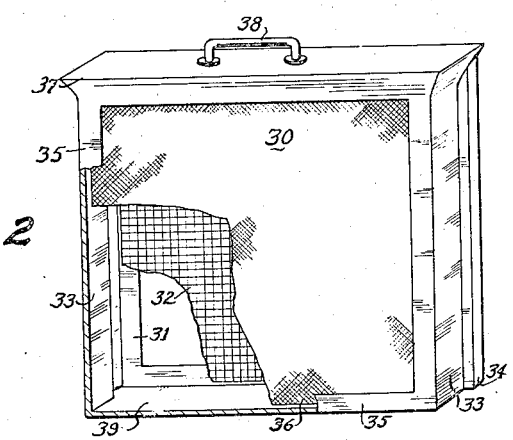
Figure 5 is a perspective view of the filter member alone, with portions thereof broken away to show construction.
Figure 3:
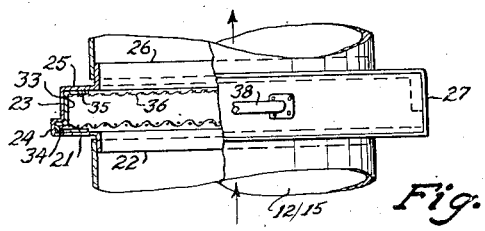
Figure 3 is a view of the same portion with the filter unit therein taken substantially along the line and in the direction of the arrows 3—3 of the Figure 2.

Referring to the drawing there is shown in the Figure 1 a hot air furnace 11, and a blower or suction fan 14. There is also shown a warm air pipe 12 leading from the furnace 11 to the register 13 in the wall 18; and a cold air return pipe 15 leading from the grille 16 in the floor 17 to the blower 14. The conduit 19 connecting the furnace 11 and the blower 14 completes the circuit of air.

The instant invention consists of the combination of a box-like receptacle member 20 of suitable size mounted in either the main air pipes 12, or the cold air return pipe 15; and a filter member 30 removably mounted in the receptacle member 20. Each of these members will be described in detail hereinafter.

The receptacle member 20 consists of a front rectangular frame forming the wall 21, to which there is attached, and from which there extends outwardly at a central opening, a collar 22. This collar 22 is made to receive or engage an open end of the pipe 12. If the device is to be mounted in the cold air return duct, then it is made to fit the pipe or duct 15. Spaced from the front wall 21 there is a rear rectangular frame forming the wall 25. The wall 25, similarly, has a second collar 26 at a central opening which is made to receive or engage another open end of either the pipe 12 or duct 15. The two open ends of the pipe or duct 12 or 15 respectively are alined as shown and are suitably spaced to permit the insertion of, and installation of, the device herein described.

The two spaced walls 21 and 25 are connected around three of their outer edges by the side walls 23 and the bottom wall 29. Each of the two side walls 23 has a channel 24 therein as shown. The open top 27 of the receptacle member 20 formed by the walls 21, 23 and 25 is flared outwardly as shown.

The filter member 30 consists of a front frame or open wall 31 across which there is mounted a wire screen 32; spaced from the wall 31 there is a second frame or open rear wall 35 across which there is mounted a fine wire mesh 36; and top, side and bottom walls 37, 33 and 39, respectively. The two spaced parallel side walls 33 have alined flanges 34 which fit and slidably engage the channels 24 in the heretofore described receptacle 20. The top 37 has a handle 38 thereon, and the top portion of the front, rear and side walls 31, 35 and 33 proximate to the top 37 is tapered to snugly fit the flared portion of the walls 21, 23 and 25.

In use the filter member 30, by means of the handle 38 is inserted in the receptacle member 20 so that the screen 32 faces up-stream or in the direction from which the air current originates; and the mesh 36 faces down-stream or in the opposite direction. The front wall 31, therefore, abuts the frame 21, the rear wall 35 abuts the frame 25, the filter member side walls 33 abut the receptacle mesh side walls 23, and the two bottom walls 39 and 29 lie parallel and proximate to each other but need not be in actual contact.

In order to insure the proper insertion of the filter member 30 in the receptacle member 20, the channels 24 and the flanges 34 are formed closer to one frame than to the other. By so constructing the two members, coarser particles of dirt or dust are filtered or removed from the air stream by the coarse screen 32, rather than by the fine mesh 36. The filter is not so easily or quickly clogged and enables a free flow of warm air to be maintained for a longer period of time.

It has been found in practice that the fine wire mesh 36 alone is soon clogged by the coarse particles of dust or dirt in the pipes. With this construction the coarse screen 32 is not so easily blocked or coated with dust. While it retains and holds the coarser dust and dirt it nevertheless permits air and finer particles of dust to pass through. Those finer particles are then stopped by the mesh 36. In this way the filter member 30 may be used for a much longer period of time than would otherwise be possible.

In actual practice it has been found that a coarse wire screen having between sixteen to twenty strands per lineal inch is satisfactory for the front wall 31 of the filter. A fine wire mesh or metal cloth having between one hundred and fifty to two hundred strands per lineal inch is satisfactory for the second wall 35 of the filter.

I prefer to use bronze wire for the screen 32 and mesh 36, and to use rust-proof metal for the construction of the other parts of the filter member 30. Any non-corroding or rust-proof material for the filter is practical; because, since one of the principal advantages of this device is that it may easily and quickly be cleaned, all the user need do is to immerse a dust laden filter unit in a bath of naphtha or gasoline, and the unit is again ready for use. A soft hair brush assists in removing the particles of dust that may adhere more strongly than others.

It should be noted that any or all of the filter members may be removed for cleaning or replacement without having to shut down the furnace or stopping the blower. The filter members may be easily removed for inspection without the use of cumbersome tools or a time consuming operation. Each separate filter may be cleaned as needed without disturbing the others.

The tapered top 37 of the filter member snugly fits and engages the flared top 27 of the receptacle member, so that there is no heat loss or possibility of extraneous dust or dirt entering the system. This device is entirely fireproof and completely sanitary. It has no small loose parts which might become lost or misplaced and in the main, once installed, consists of one handy removable filter member which is relatively durable, and therefore economical and practical.

Having thus disclosed the invention in its preferred form it should be understood that as there may be other forms or modifications of the invention no limitations thereon are intended except those imposed thereon by the scope of the following claims.

I claim:

1. In a conduit, an air cleaner, comprising in combination, a sheet metal receptacle member interposed in the conduit, the said receptacle member having spaced wall portions extending crosswise of the aforesaid conduit, an opening in one end thereof and an offset groove in the side wall thereof, and a sheet metal filter member removably mounted in the receptacle member having a coarse screen and a fine mesh mounted on spaced frame portions thereof and a closure portion for the aforesaid opening, the said frame portion being between the said wall portions and the screen and mesh thereon being interposed in the column of air in the aforesaid conduit, the said frame portions including side walls having an offset tongue thereon engageable with the aforesaid offset groove, whereby the filter member can be inserted into the receptacle member in only one position wherein the said screen faces the conduit port and the said mesh faces the conduit vent.

2. In a conduit, an air cleaner, comprising in combination, a sheet metal receptacle member interposed in the conduit, the said receptacle member having spaced wall portions extending crosswise of the aforesaid conduit, a tapered opening in one end thereof and a pair of opposed offset grooves in the side walls thereof, and a sheet metal filter member removably mounted in the receptacle member having a coarse screen and a fine mesh mounted on spaced frame portions thereof and a tapered closure portion, including a handle, fitting the aforesaid tapered opening, the said frame portion being between the said wall portions and the screen and mesh thereon being interposed in the column of air in the aforesaid conduit, the said frame portion including side walls having a pair of offset tongues thereon engageable with the aforesaid offset grooves, whereby the filter member can be inserted into the receptacle member in only one position wherein the said screen faces the conduit port and the said mesh faces the conduit vent.

3. An air cleaner of the type defined in claim number 2 and further characterized by the said mesh being made of a metallic material and having about one hundred and fifty openings to the lineal inch.

JOHN F. DONAT.

REFERENCES CITED

The following references are of record in the file of this patent:

UNITED STATES PATENTS

| Number | Name | Date |
|---|---|---|
| 378,188 | Bruhn et al. | Feb. 21, 1888 |
| 764,922 | Davis | July 12, 1904 |
| 858,607 | Krautzberger | July 2, 1907 |